United States Patent
Bieber et al.

(10) Patent No.: US 8,684,128 B2
(45) Date of Patent: Apr. 1, 2014

(54) STEERING GEAR WITH ELECTRIC MOTOR, CONTROL UNIT AND SENSOR ARRANGEMENT, AND ELECTRIC POWER STEERING SYSTEM EQUIPPED THEREWITH

(71) Applicant: ZF Lenksysteme GMBH, Schwaebisch Gmuend (DE)

(72) Inventors: Juergen Bieber, Pluederhausen (DE); Martin Budaker, Heubach (DE); Thomas Kuehnhoefer, Heubach (DE)

(73) Assignee: ZF Lenksysteme GmbH, Schwaebisch Gmuend (DE)

(*) Notice: Subject to any disclaimer, the term of this patent is extended or adjusted under 35 U.S.C. 154(b) by 0 days.

(21) Appl. No.: 13/845,555

(22) Filed: Mar. 18, 2013

(65) Prior Publication Data
US 2013/0213727 A1    Aug. 22, 2013

Related U.S. Application Data

(63) Continuation of application No. PCT/EP2011/065805, filed on Sep. 13, 2011.

(30) Foreign Application Priority Data

Sep. 30, 2010   (DE) .......................... 10 2010 041 744

(51) Int. Cl.
   *B62D 5/04*    (2006.01)
(52) U.S. Cl.
   USPC ........................................................ 180/444
(58) Field of Classification Search
   USPC ............................................. 180/443, 444
   See application file for complete search history.

(56) References Cited

U.S. PATENT DOCUMENTS

| | | | |
|---|---|---|---|
| 4,715,462 A * | 12/1987 | Taig .............................. | 180/444 |
| 6,194,849 B1 | 2/2001 | Wilson-Jones et al. | |
| 6,211,631 B1 | 4/2001 | Wilson-Jones et al. | |
| 2005/0178608 A1 * | 8/2005 | Shiino et al. .................. | 180/444 |

FOREIGN PATENT DOCUMENTS

| | | |
|---|---|---|
| DE | 198 14 719 | 10/1999 |
| DE | 100 37 485 | 2/2002 |
| DE | 697 12 595 | 8/2002 |
| DE | 102 21 340 | 11/2003 |
| DE | 10 2005 007 357 | 9/2005 |
| DE | 10 2005 046 618 | 4/2007 |
| DE | 10 2007 011 672 | 6/2008 |
| DE | 10 2008 001 503 | 11/2009 |
| DE | 10 2008 040 318 | 1/2010 |
| DE | 10 2008 042 213 | 3/2010 |
| EP | 2 113 443 | 11/2009 |

* cited by examiner

*Primary Examiner* — Kevin Hurley
(74) *Attorney, Agent, or Firm* — Jordan and Hamburg LLP

(57) ABSTRACT

A steering gear comprises a helical pinion and a helical gear which are mounted in the gear housing and driven by an electric motor, wherein a control unit and a sensor system connected thereto are also disposed in or on the steering gear so as to detect and control the rotor position and/or rotation of the rotor of the electric motor. A section of the shaft of the worm located on the drive side extends in the axial direction and protrudes from the gear housing, wherein the protruding end of the section on the drive side is designed as a rotor shaft of the electric motor, and the control unit and/or the sensor system are disposed on the gear housing. The control unit and the sensor system are preferably disposed on differing sections of the gear housing. This allows a very compact, cost-saving and flexible implementation of the design.

10 Claims, 4 Drawing Sheets

STEERING GEAR WITH ELECTRIC MOTOR, CONTROL UNIT AND SENSOR ARRANGEMENT, AND ELECTRIC POWER STEERING SYSTEM EQUIPPED THEREWITH

This is a Continuation of PCT/EP2011/065805 Filed Sep. 13, 2011.

BACKGROUND OF THE INVENTION

The invention relates to a steering gear comprising an electric motor, a control unit and a sensor system and to an electric power steering system equipped therewith. The invention relates in particular to a steering gear that is designed as a helical gear mechanism or a worm gear mechanism for an electric power steering system.

A steering gear of the type in question in the form of a helical gear mechanism for use in an electric power steering system is known from DE 19814719 A1. FIG. 1 shows the known steering gear 10, which comprises a housing, in which a helical gear, namely the worm wheel 40, and a helical pinion engaging therein, namely the worm 30, are disposed. The steering gear is equipped with an electric motor (stator 94, rotor 92), which is connected to the shaft of the worm 30 so as to drive the same. As is briefly described there (column 2, lines 48-49), the electric motor is controlled in the known manner by rotational speed and rotational direction sensors. It can therefore be assumed that an open-loop or closed-loop control unit and a sensor system, which can be disposed in or on the housing cover 12 of the electric motor for example, are also provided for controlling the electric motor there.

It is customary to provide the control electronics, and the sensors in particular, directly on, or at least very close to, the electric motor so as to exactly detect the rotational movement of the rotor. So as to actuate the electric motor, the rotational angle, the revolutions or rotational speed, and/or the rotational direction of the rotor must be determined as exactly as possible and be continually monitored. The customary arrangement of a sensor system directly on, or at least very close to, the electric motor is described in the following published prior art, for example: DE 10 2008 042 213 A1, DE 10 2008 040 318 A1 or DE 100 37 485 A1, wherein the latter reference refers explicitly to a steering gear in the form of a helical gear mechanism.

The sensors used are typically Hall sensors and/or magnetoresistive sensors (MR sensors), as is described in DE 10 2007 011 672 A1 or DE 102 21 340 A1, for example.

As far as the arrangement of the control unit is concerned, it is customary to likewise dispose the some directly on the electric motor, or at least very close thereto. For this purpose reference is made to DE 10 2008 001 503 A1 (see FIG. 1 or FIG. 2), for example, which comprises a control unit 9 that is disposed on the electric motor 8. While this published prior art refers to steering gears for a steering column drive, arrangements are shown of different embodiments with arrangements of the control unit (see FIG. 6) that are also typical of other steering gears. The control unit can thus be disposed laterally from the electric motor (see FIGS. 1 to 4) or axially offset at the rear end of the electric motor (see FIGS. 5 to 9). Because the arrangement of the sensor system is not explicitly described there, it can be assumed that the sensor system is integrated in the control unit.

Thus, steering gears are known in principle, comprising a helical pinion (for example including a worm), which are mounted in the gear housing and driven by an electric motor, wherein a control unit and a sensor system connected thereto are also disposed in or on the steering gear so as to detect and control the rotor position and/or rotation of the rotor of the electric motor.

The arrangement of the control unit and of the sensor system greatly influences the overall size (length and/or width) of the steering gear, which can make installation more difficult and increase the overall installed size. This must be considered in particular in connection with steering gears that are designed as helical gear mechanisms or worm gear mechanisms. One of the reasons is that the worm is typically mounted at the two shaft ends thereof and connected by way of one of the shaft ends thereof to the rotor shaft of the electric motor. This results in quite a significant, and often times hindering, length in the axial direction, which in many cases makes the steering gear difficult, or even impossible, to install.

Thus, it is the object of the invention to considerably improve a steering gear of the type mentioned above and the pivot bearing arrangement of the helical pinion shaft or worm shaft. This is intended to overcome the aforementioned drawbacks of the conventional solutions in an advantageous manner. In particular, savings of components are to be achieved and a compact design is to be proposed.

SUMMARY OF THE INVENTION

A steering gear is thus proposed, comprising a helical pinion (for example including a worm), which has a shaft that is mounted in the gear housing and can be driven by an electric motor, wherein the section of the shaft located on the drive side extends in the axial direction and protrudes from the gear housing, wherein the protruding end of the section on the drive side is designed as a rotor shaft of the electric motor, and wherein the control unit and/or the sensor system are disposed on the gear housing. The sensor system is in particular disposed on the section of the shaft of the helical pinion that is not located on the drive side.

Proceeding from a typical gear design, in which the helical pinion or worm bearing arrangement is implemented in the gear housing, the shaft end on the drive side is extended and designed as a rotor, so that the electric motor can be disposed directly on the gear housing. In a manner that saves components, the fixed bearing of the worm bearing arrangement is thus also used to mount the rotor, wherein the corresponding section of the worm shaft can be implemented considerably shorter than in the prior art. This in turn allows in particular that the control unit is not disposed on the motor housing, but on the cooler gear housing, so as to thereby more effectively cool the heat-generating power electronics system. It is therefore advantageous if the heat-generating power components of the control electronics are disposed on the gear housing, notably on a cooling surface of the gear housing. Additionally, the sensor system also need not be disposed on the motor shaft, but can be disposed on the section of the shaft of the helical pinion that is not located on the drive side, which offers high flexibility in terms of the design options. Moreover, the following advantage is attained: because the continuous worm shaft also serves as the motor shaft, the sensor system thus arranged can directly and exactly detect the rotor position and/or rotor speed of the motor shaft. It is thus possible to dispose the sensor system at the free end of the worm shaft, and thereby arrive at greater variation options in terms of the design, without compromising the sensor measurement accuracy.

In addition, the pivot bearing arrangement of the helical pinion shaft or worm shaft that is implemented in the gear housing can be dimensioned substantially as with a conventional helical gear mechanism. The sensor system for monitoring the rotor position and/or rotor speed is disposed at the other end of the shaft, which is to say at the end of the worm shaft that is not located on the drive side.

The motor housing and the gear housing are preferably designed as one piece so as to form a single housing. To this end, the rotor of the motor can have a crucible shape, so that the same surrounds the fixed bearing. In total, the design can be implemented in a very compact manner. The fixed bearing can also be moved out of the gear housing section and into the motor housing section. To this end, the rotor of the motor can have a crucible shape, so that the same surrounds the fixed bearing. In total, the design can be implemented in a very compact manner.

The control unit and the sensor system can thus be disposed on differing sections of the gear housing. Both are preferably integrated in a housing (control housing) for this purpose, which can be an L-shaped or T-shaped housing, for example.

It is also possible for the control unit, or at least power components thereof, to be disposed separately from the sensor system on differing sections of the gear housing. The control unit, or at least the power components, are connected to the sensor system by way of signal lines for this purpose.

Another object of the invention is an electric power steering system, which is equipped with such a steering gear.

The invention will be described in detail hereafter based on exemplary embodiments and with reference to the accompanying drawings.

DESCRIPTION OF THE PREFERRED EMBODIMENTS

Figure 1:
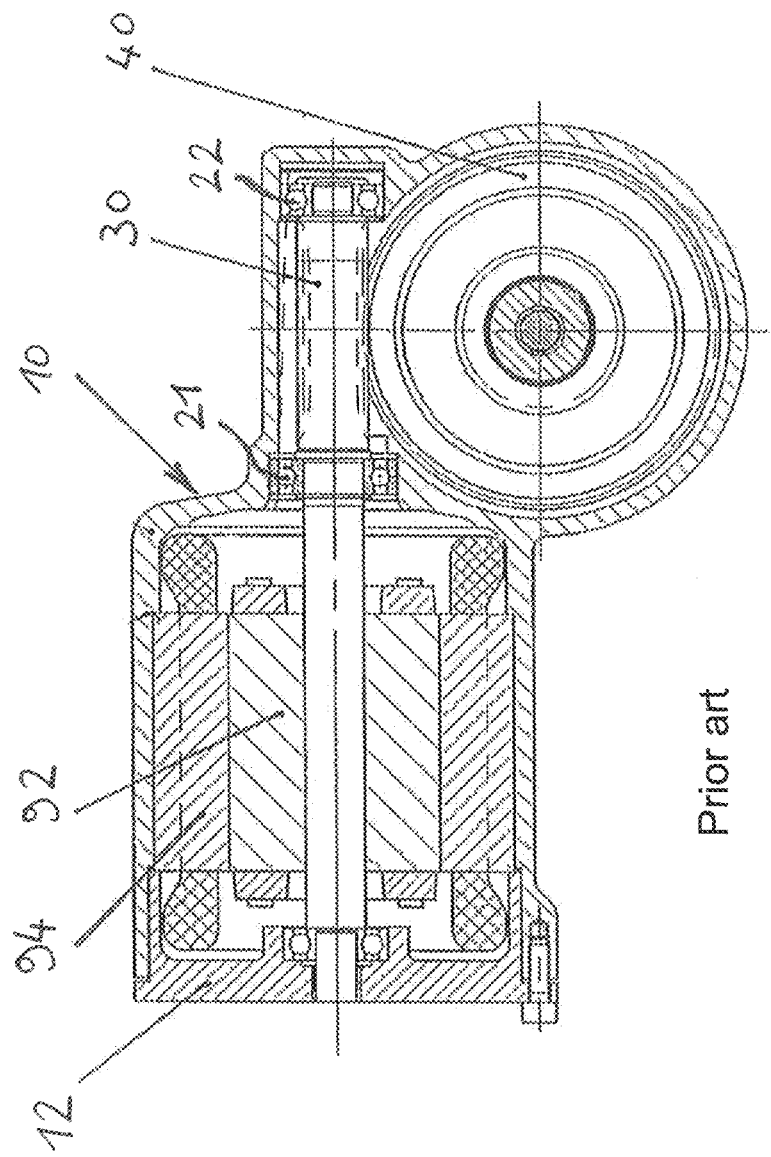
FIG. 1 shows a conventional steering gear construction.
Figure 2:
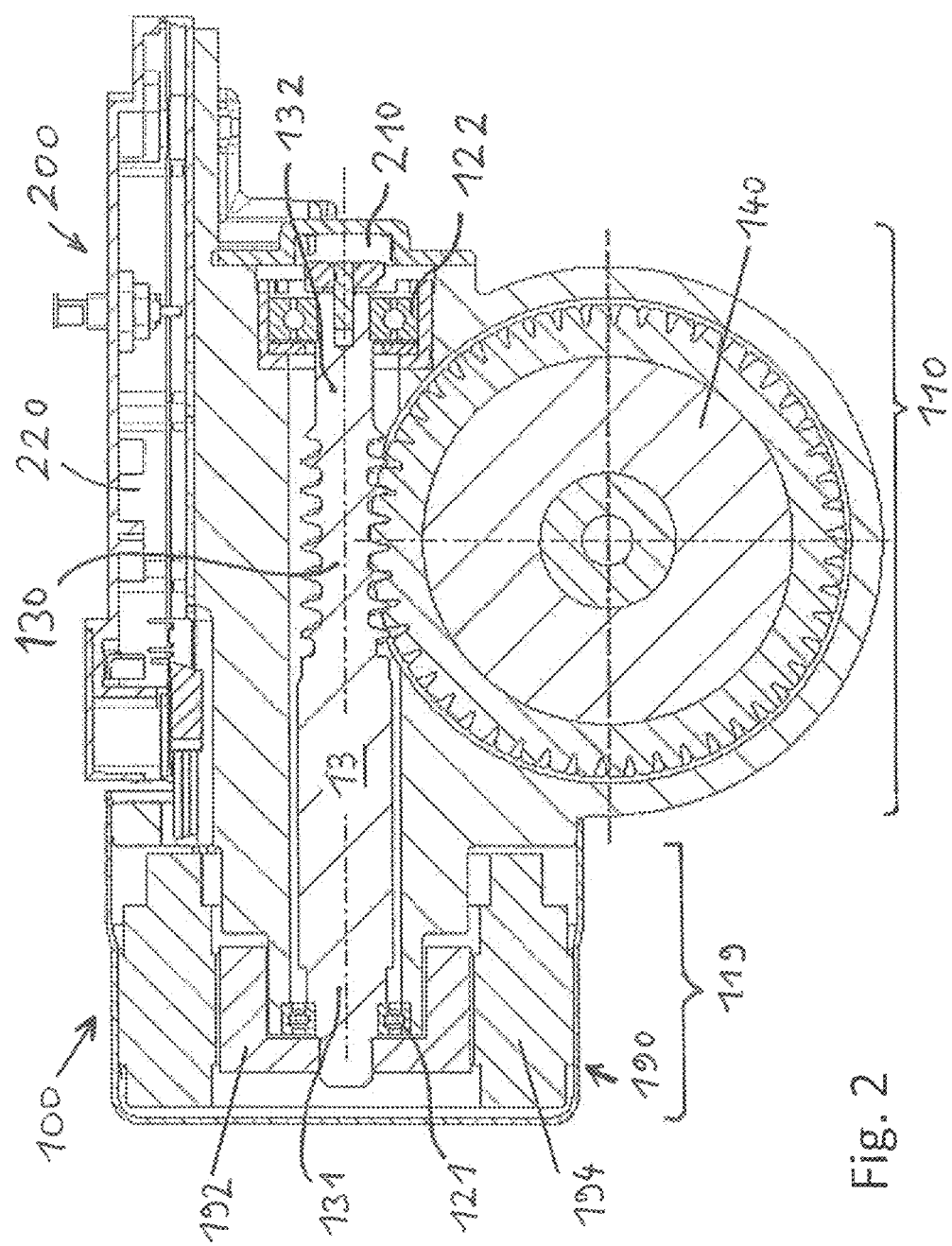
FIG. 2 is an illustration of a steering gear design according to the invention and shows a first arrangement of the sensor system.

Compared to the conventional steering gear construction shown in FIG. 1, the exemplary embodiment of a steering gear 100 according to the invention shown in FIG. 2 has the following construction.

A helical pinion 130, which is designed as a worm, is mounted in the gear housing 110 or the motor housing 119 directly adjoining the same. The shaft 13 of the worm 130 is mounted on the drive side in a fixed bearing 121 in the motor housing. To this end, the section 131 of the shaft on the drive side is accommodated in a corresponding first shaft bearing arrangement 121, which is designed as a pivot bearing. The section 131 on the drive side is designed as a rotor shaft, which thus forms part of the rotor 192 of an electric motor 190. The rotor 192 has a crucible shape and surrounds the shaft end 131. In other words: the fixed bearing 121 is basically located at the center of the motor 190 because the rotor 192, or the at least one permanent magnet thereof, has a crucible shape, so that the fixed bearing 121 is enclosed. Even more stable mounting of the motor and an even more compact design are thus achieved, so that an additional support bearing can be entirely eliminated, even with heavy or long rotors.

A floating bearing 122, the bearing bushing of which can exhibit radial elasticity, is located at the end of the shaft 13 that is not driven. The floating bearing or shaft bearing arrangement 122 can additionally be provided with axial spring loading. The worm 130 is engaged with a worm wheel 140, which is optimized by the pivotable mounting on the fixed bearing side.

As is also apparent from FIG. 2, the section 131 on the drive side extends out of the gear housing 110 and at the end region thereof is used as a (free) rotor shaft for the electric motor 190. The shaft 13 is thus continuous and penetrates both the gear housing 110 and the motor housing 119. This means that the continuous shaft 13 is integrally designed as a worm shaft and rotor shaft. The fixed bearing or the first shaft bearing arrangement 121 is preferably designed as a pivot bearing and thus serves to mount the worm shaft and also as a rotor bearing arrangement. This design that is proposed here can be implemented in a very compact manner.

As a further deviation from customary designs, the control unit 200 and the sensor system 210 are also located on the gear housing 110. The sensor system 210 is disposed directly on the free shaft end, which is to say at the section 132 of the shaft 13 that is not located on the drive side, and can exactly detect the rotor position, and optionally also the rotor speed. In immediate vicinity thereto, which is to say directly on the gear housing 110 or the cooling surfaces thereof, the control electronics 200 for actuating the electric motor 190 are located, wherein the motor is preferably designed as a brushless direct current motor. The lines from the sensor system 210 to the control electronics 200 can thus be kept short, which in turn reduces costs and the susceptibility to faults. The supply lines to the stator windings 194 of the motor 190 can also be kept short. The electrical power loss is thus minimized.

As is shown by way of example in FIG. 2, warmth and heat-generating parts of the control electronics, which is to say the power components 220 or the output stage components of the control device, are preferably disposed directly on the gear housing 110 so as to be cooled there, by the surface of the gear housing. The surface can be designed for this purpose as a cooling element or heat sink comprising cooling fins. According to the invention, control device parts are thus arranged in an effective cooling and space-saving manner in a modular design.

The gear housing 110 and the motor housing 119 are preferably implemented as a single-piece housing, wherein each housing section 110 or 119 is optimized for the respective function.

The overall design of the shaft bearing arrangement proposed here constitutes a floating bearing arrangement of the shaft designed integrally as a worm and rotor and can be implemented in a very compact and cost-effective manner in an electric power steering system.

As is shown in FIG. 2, the sensor system 210 for detecting the rotor position is disposed on the free shaft end of the worm 130. The sensor system 210 and the control device 200 or the power components 220 can also be integrated in a housing (control housing).

Figure 3:
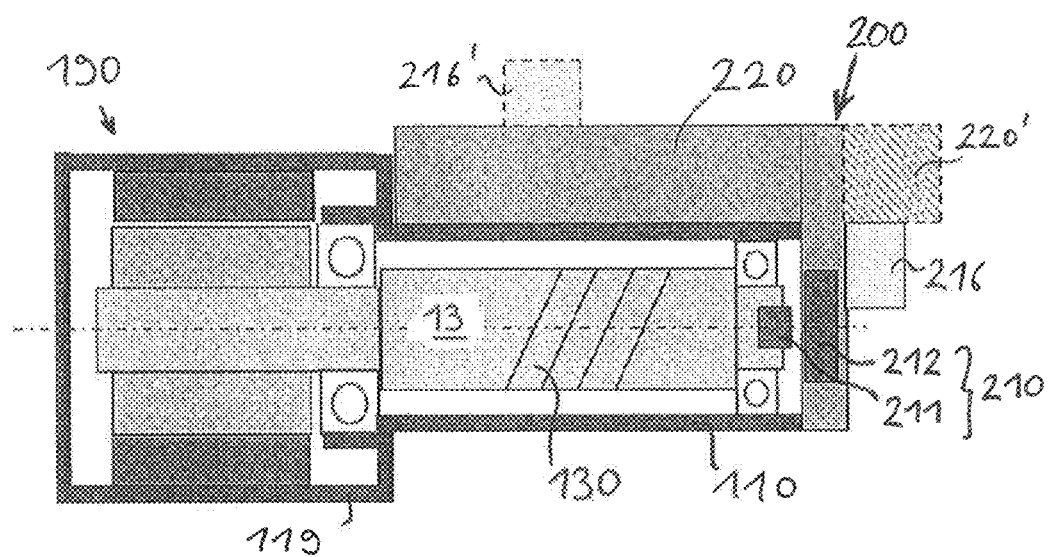
FIG. 3 is an illustration of a steering gear design according to the invention and shows two variants of the same.

FIG. 3 illustrates this principle based on the following two variants:

In a first variant (solid lines), the housing of the control electronics 200 has an L shape and comprises the power components 220 and the sensor system 210, or the actual sensors 212 (Hall and/or MR sensors) with the corresponding wiring thereof. The sensor system 210 also includes the transducer magnets 211, which are disposed at the shaft end and thus rotate together with the shaft 13. Suitable plug connectors 216 are provided on the L-shaped housing, here in the region of the sensor system 210, to supply the power or connect the control electronics 200 (control unit or device) to the battery.

In a second variant (dotted lines), the housing of the control electronics 200 can have a T shape, wherein the plug connectors or power supply connections 216' are provided in the vicinity of the power electronics 220.

Depending on the installation situation, the design can be adapted to the available installation space in accordance with the variants shown here or other similar variants.

Figure 4:
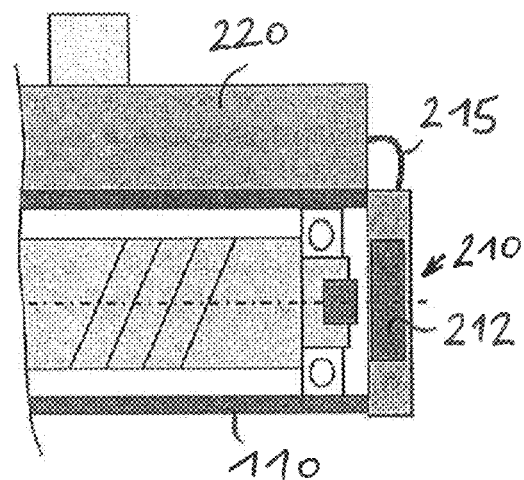
FIG. 4 is an illustration of a steering gear design according to the invention and shows another variant of the same.

FIG. 4 illustrates another variant in the form of a partial view, in which the power electronics 220, or the components thereof, and the sensor system, or the actual sensors 212, are disposed in different, spatially separated housings. This allows the arrangement to be adapted even better to differing installation situations. In particular, the sensors can be oriented and aligned even more flexibly toward the transducer magnets. In addition, no heat is transferred from the power electronics 220 to the sensor system 210. The sensor system 210 is connected by way of lines, such as a ribbon cable or flat cable, to the control unit or power components 220.

While the invention is described by way of example based on a worm gear mechanism, the invention is not limited to worm gear mechanisms, but can generally be applied to any type of helical gear mechanisms. The exemplary embodiment shown is suitable in particular for use in an electric power steering system for motor vehicles.

LIST OF REFERENCE NUMERALS

10 customary steering gear comprising a worm 30 and worm wheel 40, and further comprising a fixed bearing 21, and floating bearing 22 for the worm shaft; additionally comprising an electric motor including a rotor 92 and a stator 94 and housing cover 12
100 steering gear (designed here as a worm gear mechanism)
110 gear housing or housing section for worm bearing arrangement
121 first shaft bearing arrangement (fixed bearing)
122 second shaft bearing arrangement (floating bearing)
130 helical pinion (designed here as a worm)
13 worm shaft (shaft)
131 section on drive side
132 free end of the shaft
140 helical gear (designed here as a worm wheel)
190 electric motor (designed here as a brushless direct current motor)
19 rotor shaft (corresponds to the extended section of the worm shaft 13)
192 rotor or permanent magnets (on rotor shaft)
194 stator winding of the motor
119 motor housing or housing section for the motor
200 control electronics (control unit or device)
220 power components of the control device (externally mounted for cooling)
210 sensor system for detecting the rotor position (at the free shaft end), comprising
211 transducer magnet and sensors 212 (Hall and/or MR sensors)
215 connecting lines between sensor system and power components
216 plug connector or connection to power supply (battery)

The invention claimed is:

1. A steering gear comprising:
an electric motor and a control unit connected thereto; and
wherein the steering gear comprises a helical gear and a helical pinion engaging therein;
wherein the helical pinion comprises a shaft that can be driven by an electric motor and the shaft is mounted in a gear housing by way of a first shaft bearing arrangement and a second shaft bearing arrangement;
wherein a control unit and a sensor system connected thereto are disposed in the steering gear so as to detect and control the rotor position, and/or the rotation of the rotor of the electric motor a section of a shaft located on the drive side extends in the axial direction and protrudes from the gear, housing;
wherein the protruding end of the section on the drive side is designed as a rotor shaft of the electric motor, and the control unit and/or the sensor system are disposed on the gear housing;
wherein the control unit and the sensor system are disposed on differing sections of the gear housing; and
wherein the sensor system is disposed on a section of the shaft of the helical pinion that is not located on the drive side.

2. The steering gear according to claim 1, wherein the control unit and the sensor system are integrated in an L-shaped or T-shaped housing.

3. The steering gear according to claim 1, wherein the sensor system and the control unit, or at least power components thereof, are disposed separately from the sensor system on differing sections of the gear housing.

4. The steering gear according to claim 3, wherein the control unit or at least the power components are connected to the sensor system by way of signal lines.

5. The steering gear according to claim 3, wherein the power components of the power electronics are disposed on a cooling surface of the gear housing.

6. An electric power steering system, comprising:
a steering gear that includes an electric motor and a control unit connected thereto;
wherein the steering gear comprises a helical gear and a helical pinion engaging therein;
wherein the helical pinion comprises a shaft that can be driven by the electric motor, the shaft being mounted in a gear housing by way of a first shaft bearing arrangement and a second shaft bearing arrangement;
wherein the control unit and a sensor system connected thereto are disposed in the steering gear so as to detect and control the rotor position and/or the rotation of the rotor of the electric in motor;
wherein a section of the shaft located on the drive side extends in the axial direction and protrudes from the gear housing;
wherein the protruding end of the section on the drive side is designed as a rotor shaft of the electric motor, and the control unit and/or the sensor system are disposed on the gear housing;
wherein the control unit and the sensor system are disposed on differing sections of the gear housing; and
wherein the sensor system is disposed on a section of the shaft of the helical pinion that is not located on the drive side.

7. The steering system according to claim 5, wherein the control unit and the sensor system are integrated in an L-shaped or T-shaped housing.

8. The steering system according to claim 6, wherein the sensor system and the control unit, or at least power components thereof, are disposed separately from the sensor system on differing sections of the gear housing.

9. The steering system according to claim 8, wherein the control unit or at least the power components are connected to the sensor system by way of signal lines.

10. The steering system according to claim 8, wherein the power components of the power electronics are disposed on a cooling surface of the gear housing.

\* \* \* \* \*